(12) United States Patent
Haase et al.

(10) Patent No.: US 8,996,565 B2
(45) Date of Patent: Mar. 31, 2015

(54) SYSTEMS AND METHODS FOR IN-MEMORY DATABASE PROCESSING

(71) Applicant: SAP AG, Walldorf (DE)

(72) Inventors: Cornelia Haase, Walldorf (DE); Kerstin Hoeft, Wiesloch (DE); Jens Lieberum, Ketsch (DE); Christian Stork, Boenen (DE); Steffen Weinstock, Sinsheim (DE)

(73) Assignee: SAP SE, Walldorf (DE)

( * ) Notice: Subject to any disclaimer, the term of this patent is extended or adjusted under 35 U.S.C. 154(b) by 176 days.

(21) Appl. No.: 13/718,251

(22) Filed: Dec. 18, 2012

(65) Prior Publication Data

US 2014/0172788 A1 Jun. 19, 2014

(51) Int. Cl.
*G06F 17/30* (2006.01)
*G06Q 10/06* (2012.01)

(52) U.S. Cl.
CPC .......... *G06F 17/30575* (2013.01); *G06Q 10/06* (2013.01)
USPC ........... 707/769; 707/784; 707/792; 707/740; 707/610; 705/7.27; 705/7.36; 709/201; 709/203; 709/217; 719/317; 719/328

(58) Field of Classification Search
CPC .............. G06F 17/30575; G06F 17/30; G06F 17/30424; G06F 17/30345; G06F 17/30289; G06F 17/3017; G06F 17/30657; G06F 17/30598; G06F 21/00; G06F 17/30159; G06Q 10/06; G06Q 10/0875
USPC ......... 707/610, 769, 740, 784, 792, 693, 756, 707/758, 737, 797, 776, 803, 802, 804, 707/E17.087, E17.089, E17.046, E17.005, 707/E17.055, E17.014, E17.044; 705/7.27, 705/7.36, 348, 14.68, 26.81, 51, 301; 715/765, 804, 778, 781, 806, 764; 709/201, 203, 213, 217, 310; 719/317, 719/328

See application file for complete search history.

(56) References Cited

U.S. PATENT DOCUMENTS

| | | | | |
|---|---|---|---|---|
| 6,239,810 | B1 * | 5/2001 | Van Hook et al. | 345/420 |
| 6,948,088 | B1 * | 9/2005 | Sharan | 714/6.31 |
| 7,506,297 | B2 * | 3/2009 | Mukherjee et al. | 716/104 |
| 7,739,393 | B2 * | 6/2010 | Lu et al. | 709/230 |
| 2002/0107957 | A1 * | 8/2002 | Zargham et al. | 709/224 |
| 2002/0147606 | A1 * | 10/2002 | Hoffmann et al. | 705/1 |
| 2003/0033437 | A1 * | 2/2003 | Fischer et al. | 709/310 |

(Continued)

OTHER PUBLICATIONS

Breternitz, M. ; Dept. of Electr. & Comput. Eng., Carnegie Mellon Univ., Pittsburgh, PA, USA ; Shen, J.P.—"Architecture synthesis of high-performance application-specific processors"—Published in: Design Automation Conference, 1990. Proceedings., 27th ACM/IEEE Date of Conference: Jun. 24-28, 1990—pp. 542-548.*

(Continued)

*Primary Examiner* — Anh Ly
(74) *Attorney, Agent, or Firm* — Mintz Levin Cohn Ferris Glovsky and Popeo, P.C.

(57) ABSTRACT

A system, a method, and a computer program product for in-memory database processing are provided. A business object is generated in a first system. The generated business object is replicated from the first system to a second system. A high performance application implementing the replicated business object is executed based on at least one system specific view.

20 Claims, 10 Drawing Sheets

(56) References Cited

U.S. PATENT DOCUMENTS

| | | | |
|---|---|---|---|
| 2004/0122869 A1* | 6/2004 | Muehl et al. | 707/201 |
| 2005/0044197 A1* | 2/2005 | Lai | 709/223 |
| 2005/0055382 A1 | 3/2005 | Ferrat et al. | |
| 2005/0071596 A1* | 3/2005 | Aschoff et al. | 711/170 |
| 2005/0251527 A1* | 11/2005 | Phillips et al. | 707/101 |
| 2006/0026018 A1* | 2/2006 | Exner et al. | 705/1 |
| 2006/0212543 A1* | 9/2006 | O'Farrell et al. | 709/219 |
| 2006/0212846 A1* | 9/2006 | O'Farrell et al. | 717/116 |
| 2007/0143339 A1 | 6/2007 | Springett | |
| 2007/0266051 A1* | 11/2007 | Moore | 707/200 |
| 2008/0162509 A1 | 7/2008 | Becker | |
| 2008/0163124 A1* | 7/2008 | Bonev et al. | 715/853 |
| 2008/0271052 A1* | 10/2008 | Nogge et al. | 719/317 |
| 2009/0172003 A1* | 7/2009 | Jentsch et al. | 707/102 |
| 2010/0122239 A1* | 5/2010 | Neufeld et al. | 717/131 |
| 2010/0145942 A1* | 6/2010 | Stork et al. | 707/736 |
| 2010/0251230 A1* | 9/2010 | O'Farrell et al. | 717/173 |
| 2010/0274759 A1* | 10/2010 | Takeuchi et al. | 707/624 |
| 2010/0287570 A1* | 11/2010 | Mock | 719/328 |
| 2011/0004637 A1* | 1/2011 | O'Farrell et al. | 707/809 |
| 2011/0126214 A1* | 5/2011 | O'Farrell et al. | 719/316 |
| 2011/0302135 A1 | 12/2011 | Prophete et al. | |
| 2012/0173589 A1 | 7/2012 | Kwon et al. | |
| 2013/0179435 A1* | 7/2013 | Stadter, Ralph | 707/722 |
| 2014/0180961 A1* | 6/2014 | Hankins et al. | 705/348 |

OTHER PUBLICATIONS

Maurice V. Wilkes: AT&T Research Laboratories—Cambridge, UK—"The memory gap and the future of high performance memories"—Newsletter ACM SIGARCH Computer Architecture News Homepagearchive vol. 29 Issue 1, Mar. 2001 pp. 2-7.*

European Search Report dated Feb. 12, 2014 for corresponding European application No. 13004138.7.

* cited by examiner

SYSTEMS AND METHODS FOR IN-MEMORY DATABASE PROCESSING

TECHNICAL FIELD

This disclosure relates generally to data processing and, in particular, to in-memory database processing.

BACKGROUND

Businesses use a plurality of business process applications and/or services in their business operations. Applications and/or services can be programs that an end-user runs to accomplish certain tasks and can work in conjunction with one or more back-end systems, which can store the data to be worked on, such as, for example, business objects and other business data, as well as logic for manipulating the data, such as for example transactions or other business logic. Examples of back-end systems may include database systems, enterprise resource planning ("ERP") systems, and customer relationship management ("CRM") systems. A user interface ("UI") can be designed to work in concert with application programs, and facilitates interaction between humans and computers by inviting and responding to user input. In order to accomplish various tasks, a user can initiate various applications, tasks, agents, etc. that may manipulate data in different ways to achieve results desired by the user.

Users can design and/or create various business process objects, such as sales orders, invoices, etc. A business object can be created using any known computing systems and languages (e.g., one such exemplary language includes advanced business application programming ("ABAP") high level programming language, which is available from SAP AG, Walldorf, Germany). Such created objects can be stored in memory, such as in a database. An example of such database includes a High-Performance Analytic Appliance ("HANA"), which is a column-oriented, in-memory database appliance available from SAP AG, Walldorf, Germany. Each created object comes with a particular view that is specific to the system where it is created and/or stored. This can mean that views of the systems in which objects (e.g., tables) are created and stored can be different from and unknown to one another. This can prevent users from accessing business objects in the storage systems that may be accessible in the systems in which objects are created and vice versa. As such, users are unable to use such applications and/or services in a cost and time efficient manner.

SUMMARY

In some implementations, the current subject matter relates to a computer implemented method for in-memory database processing. The method can include generating a business object in a first system, replicating the generated business object from the first system to a second system, and executing, based on at least one system specific view, a high performance application implementing the replicated business object. At least one of the generating, the replicating, and the executing can be performed on at least one processor.

In some implementations, the current subject matter can include one or more of the following optional features. The first system can be an enterprise resource planning system. The second system can be a high performance analytic appliance in-memory database system.

In some implementations, execution of the high performance application can include obtaining a metadata for a business object from the first system, providing the obtained metadata to the second system, providing, using the provided metadata, access to at least one business object in the second system, and generating, based on the at least one system specific view, at least one artifact of at least one of the first system and the second system.

In some implementations, replication of the generated business object can be performed based on at least one replication schema stored in the second system. The business object can include a table containing at least one column and at least one row. A data replicator module can performs the replication of the business object by performing at least one of the following operations: overtake at least one column in the table, overtake metadata added to the table in the first system, rename the table in the second system, optionally specify at least one foreign key associated with the table for overtaking, optionally specify at least one index associated with the table for overtaking, specify at least one of the row store or column store for storing the table in the second system, add a column, remove a column, and provide at least one data type mapping. The data replicator module can create at least one of the following: a replication projection view for providing access to a replicated table in the second system, and an external view for providing OpenSQL access to the second system.

Computer program products are also described that comprise non-transitory computer readable media storing instructions, which when executed one or more data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

In some implementations, the current subject matter relates to a system and a method for coupling a High Performance Analytic Appliance ("HANA") database system into an advanced business application programming ("ABAP") system. The current subject matter can provide an in-memory database ("IMDB") and a search engine for the purposes of analyzing large amounts of data. The current subject matter can further join the IMDB system to a productive enterprise resource planning ("ERP") system, replicate the data from the ERP system into the IMDB system, and build high performance applications ("HPAs") on top of the IMDB system using different kind of views, e.g., an analytic view and/or a calculation view.

In some implementations, HPAs can work on replicated data. The HPAs can obtain tables' metadata from the ERP system and provide it to the replication system, update tables' content regularly after an initial data loading phase, provide access to different database objects via an OpenSQL, and transport and deliver ABAP and database artifacts associated with HPA execution, based on an analytic view and/or a calculation view. The replication system can perform replication of tables' metadata by using replication control tables to determine which tables' metadata should be replicated. Once the tables' metadata is determined, the replication system defines at least one replication projection view. The system then replicates determined tables' metadata and opens replication projection views for OpenSQL execution. The determined metadata can be further maintained for an external IMDB view, which can be provided to a data dictionary that transports the table replication metadata.

Figure 1:
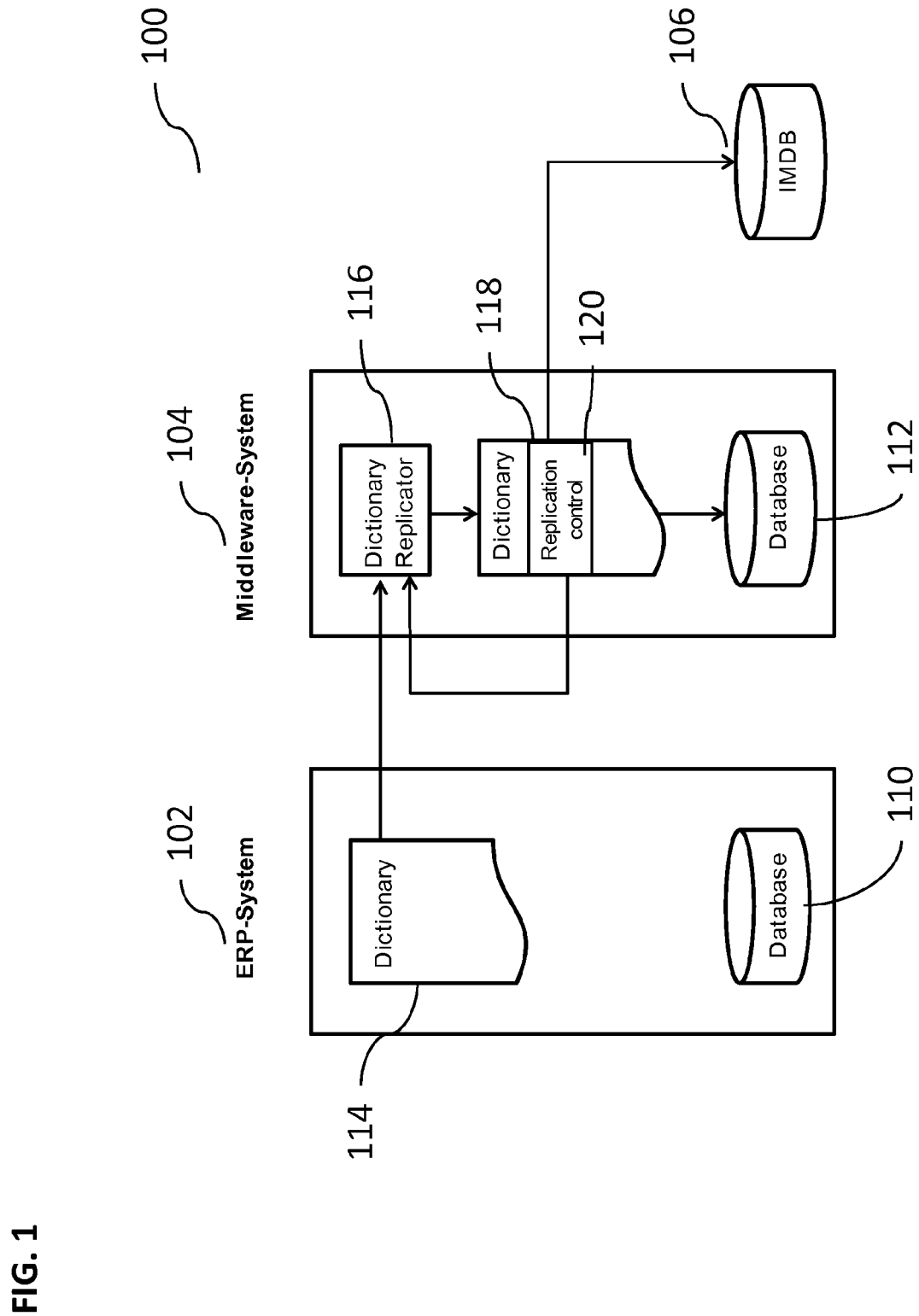
FIG. 1 illustrates an exemplary metadata replication system.

FIG. 1 illustrates an exemplary metadata replication system 100 that may replicate metadata from an ERP system 102 to an IMDB system 106. The ERP system 102 can include a dictionary 114 and a database 110, where the database 110 can be any arbitrary database. An exemplary ERP system and IMDB system are available from SAP AG, Walldorf, Germany. The system 100 can further include a middleware system 104 that can be communicatively coupled to the ERP system 102 and the IMDB system 106. The middleware system 104 can include a dictionary replicator module 116, a dictionary 118 along with a replication control module 120, and a database 112.

To perform replication, the dictionary replicator 116 in the middleware system 104 can read replication control data obtained from the replication control module 120 in the dictionary 118. The replication control data can include various attributes and/or parameters indicative of how a table is to be replicated and can include, for example, data in the table that is to be selected for replication, customer specific data that is to be selected for replication, whether the name of the table to be replicated will be changed as a result of the replication, whether foreign keys and indexes associated with the table to be replicated are to be selected for replication, whether row or column stores are to be used during replication, whether data is to be removed as a result of the replication of the table, whether data is to be added as a result of the replication of the table, whether columns should be added and/or removed from the table as a result of the replication, as well as any other information that can indicate what operations are to be performed on the table that is to be replicated. The dictionary replicator 116 can then obtain table metadata from the dictionary 114 of the ERP system 102. Then, the replicator 116 can adapt and write the obtained table metadata and any other associated data (where the table metadata and other data can include, for example, column description or definition, data types (e.g., char(n), integer, etc.), foreign key and reference fields (e.g., CURR or QUAN data types), indexes, customer specific data, and/or any other data) into the dictionary 118 and store it in the database 112 (which can be any arbitrary database) of the middleware system 104. The middleware system 104 can execute various operations that can be based on the replication control data to ensure that the table is replicated from the ERP system 102 to the IMDB system 106 in accordance with such replication control data. The tables replicated in accordance with the replication control data by the middleware system 104 are stored in the IMDB 106. Thus, the IMDB 106 and the middleware system 104 can allow metadata replication from the ERP system 102. The middleware system 104 can include an HPA application (not shown) that can be running in the ABAP runtime environment. In some implementations, Java applications can also be executed and can manage the data analysis.

Figure 2:
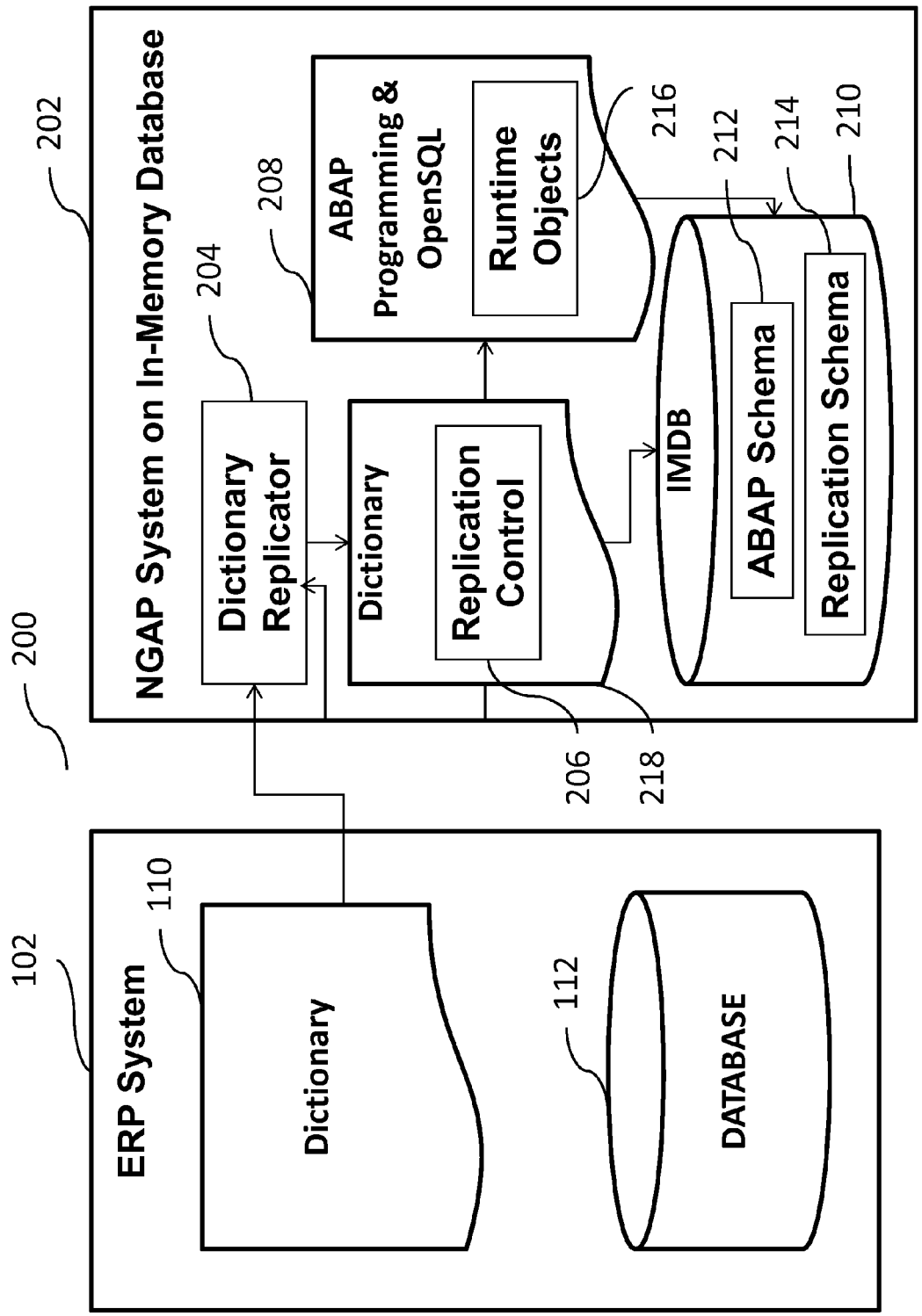
FIG. 2 illustrates an exemplary next generation ABAP platform (NGAP) system for performing metadata replication, according to some implementations of the current subject matter.

In some implementations, metadata replication can be performed by a system 200 that can include the ERP system 102 communicatively coupled to a next generation ABAP platform ("NGAP") system 202, as shown in FIG. 2. The NGAP system 202 can combine the middleware system 104 and the IMDB 106 shown in FIG. 1.

The NGAP system 202 can include a dictionary replicator module 204, a dictionary 206 that can include a replication control module 218, an IMDB 210, and an ABAP programming and OpenSQL module 208 that can include at least one runtime object 216. The IMDB 218 can include an ABAP schema 212 and a replication schema 214. To begin metadata replication, dictionary replicator module 204 can read replication control data (examples of such data are discussed above) that can be provided by the replication control module 218 in the dictionary 206. Dictionary module 110 in the ERP system 102 can provide table metadata (examples of table metadata are discussed above) to the dictionary replicator module 204. The replicator module 204 can then adapt and write the received table metadata and replication control data into the dictionary 218 and store it in the IMDB 210. The received table metadata and replication control data can be also provided to the ABAP programming and OpenSQL module 208 for executing data manipulation language ("DML") statements and providing them to the IMDB 210.

In some implementations, the dictionary replicator module 204 can perform at least one of the following: overtake (or otherwise select for transporting from one system to another system (e.g., ERP system to replication system)) a specified set of columns of every chosen transparent table, overtake customer metadata added to a table in the ERP system, rename a table in a replication system, offer to specify if foreign keys and indexes should be overtaken, offer to specify row or column store, remove data-element and domain information, allow a key column to be added for a source system separation, allow data columns to be added, allow columns to be removed, offer reasonable data type mappings, and/or allow definition of a minimal ERP release that the application needs to be executable, and/or any other functionalities and/or various combinations thereof.

To overtake different metadata parts of a table, the system 200 can obtain at least data type information that may include a length and decimals of data contained in the table, foreign keys and indexes, constraints on the tables, and/or any other table parameters. Further technical settings can be included as they can contain information as to whether a table is stored in the IMDB 210's row or column store. To overtake customer-specific metadata, customer-specific data can be located in and obtained from the ERP source system. To add or rename columns in tables, additional keys, data columns, and/or second names for tables on a database level can be included during replication process. These can be replicated from different ERP source systems without replicating the same table several times. Further, column(s) can be excluded from the original table that is being replicated. To perform data type mapping, the real data types can be mapped to the data types in the database (e.g., date and time data types are mapped to DATE and TIME data types in the database). Such data mappings can be performed according to specific columns that contain respective data types.

The following provides an overview discussion of architecture of dictionary replicator module 204 in the NGAP system 202. The dictionary replicator module 204 can be a tool which can overtake metadata for database tables from one system to another system. The dictionary replicator module 204 can perform functionalities discussed above in connection with metadata replication. It can create runtime information as well as generate and execute database definition(s) included in table(s) by taking into account customer-specific metadata. If necessary, additional database representation in the IMDB 210 can be created and/or updated.

The dictionary replicator module 204 can create two different views. One view can be replication projection view and can allow access to the replicated table using OpenSQL. Another view can be an external view that can provide OpenSQL access on IMDB calculation and/or attribute views. The dictionary replicator module 204 can operate on the following replication control tables, which can include an application name and a table's name as key column:

DDREPLICATOR table, which can contain main and header information such as name of the replication table and/or minimal release; additionally, it can include control information, e.g., return code of replication process for that table and/or if the table has already been replicated;

DDREPLINDATA table, which can contain information about columns to add and/or insert and/or data type mapping for existing table(s);

DDREPLICREF table, which can contains data handling existing foreign keys and reference fields, e.g., which can be names of tables to be referenced in the replication system; and DDREPLICNVDATA table, which can contain type conversion information for single columns in the table(s).

For every table, the replication control data can be checked for consistency. If the checks are successfully executed, the tables' metadata can be read from a source system including customer specific Append- and CI-include information. All metadata which cannot be used in the target system can be removed and manipulated so that remaining metadata can be written in target's system ABAP dictionary (not shown in FIG. 2). If necessary, according to replication control data, the table's name can be changed, columns can be added, inserted or even removed and data type mapping can be executed. Foreign key and reference table and fields can be adapted or even removed completely.

The replicated tables or replicated portions of tables along with any associated table metadata and/or other data (as discussed above), as defined by the replication control data, can be written as local objects and can be placed in a local development component. During development of applications, replicated tables or replicated portions of tables can be used to build runtime object(s), application statements can be executed, as well as any other operations can be performed.

In some implementations, various views can be created using the dictionary replicator module 204. An application can include one or more replication projection views, which can be used to access replicated tables via OpenSQL. The view's definition can be maintained in a table DDREPLICATORVI, where the following information can be included:

APPLICATION: the current application to which the view belongs;
OBJECTNAME: name of view in data dictionary;
OBJECTTYPE: VIEW;
VIEWCLASS: R (Replication Projection View);
COLUMNS: provide all columns with dictionary types and length information separated by SPACE.
BASETABLE: the name of the replicated table;
DEVCLASS: constructed projection view.

The dictionary replicator module 204 can create a projection view in the dictionary 218 using an application's name and a 'creation projection view' parameter, which can be provided to a user on a user interface. The projection view can then be created and activated in the dictionary 218 using DDREPLICATORVI information. The view can be created in the database also using dictionary replicator by using 'table and projection view replication' function that can be provided in the dictionary replicator module 204. Creation of the projection view can be performed as follows: (1) copy The dictionary replication tables discussed above along with their content and metadata information for every application and (2) create or reload the tables in the database.

In some implementations, tables can be used (or reused) in several applications, even if every application creates its own replication version for these tables. Such reuse can be possible if applications use the same name for the replicated table. To accomplish this, table columns and/or entire tables can be preserved throughout the replication process even if the source system (from where the table can originate for replication to a target system) as well as the table definition and table's replication control data are different from those in the target system.

Figure 3:
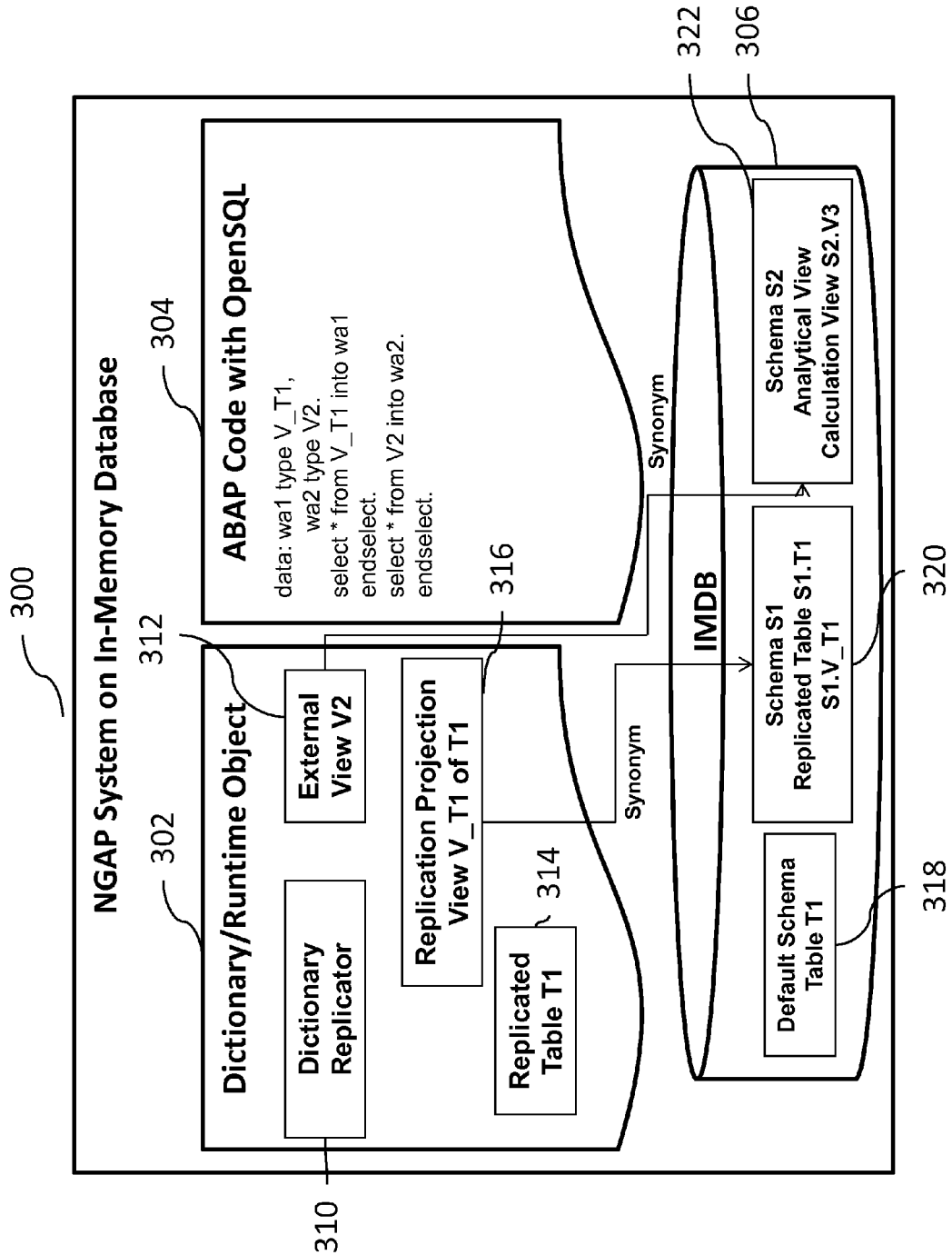
FIG. 3 illustrates an exemplary next generation ABAP platform (NGAP) system in-memory database, according to some implementations of the current subject matter.

FIG. 3 illustrates an exemplary NGAP system 300 coupled to an in-memory database, according to some implementations of the current subject matter. The system 300 can be similar to the system 202 shown in FIG. 2. The system 300 can include a dictionary/runtime object module 302, an ABAP code with OpenSQL module 304, and an IMDB 306. The module 302 can include a dictionary replicator module 310 and a replicated table T1 314, an external view V2 312 and a replicated projection view V_T1 316 of the table T1 314. The module 304 may include code (shown in FIG. 3) that can perform various functions that can assist in interfacing between the module 302 and IMDB 306. The IMDB 306 can include various replication schemas as discussed above. As shown in FIG. 3, the IMDB 306 can include a default schema 318 for storing replication of Table T1 314, a schema S1 320 for storing replicated table S1.T1 in accordance with schema S1, which is stored as S1.V_T1, and a schema S2 322 that can provide an analytical view and a calculation view S2.V3. The dictionary replicator module 310 can be used in NGAP high performance applications (HPAs) to handle HPAs' artifacts to allow their usage in ABAP environments including OpenSQL access. The dictionary replicator module 310 can be executed in the NGAP system 300 that can be built on top of IMDB 306, as shown in FIG. 3. An HPA can use the database default schema 318 to control the application, a second database schema S1 320 for the replicated table and projection views, and a third database schema S2 322 to provide analytical and/or calculation views of the replicated table.

Figure 4:
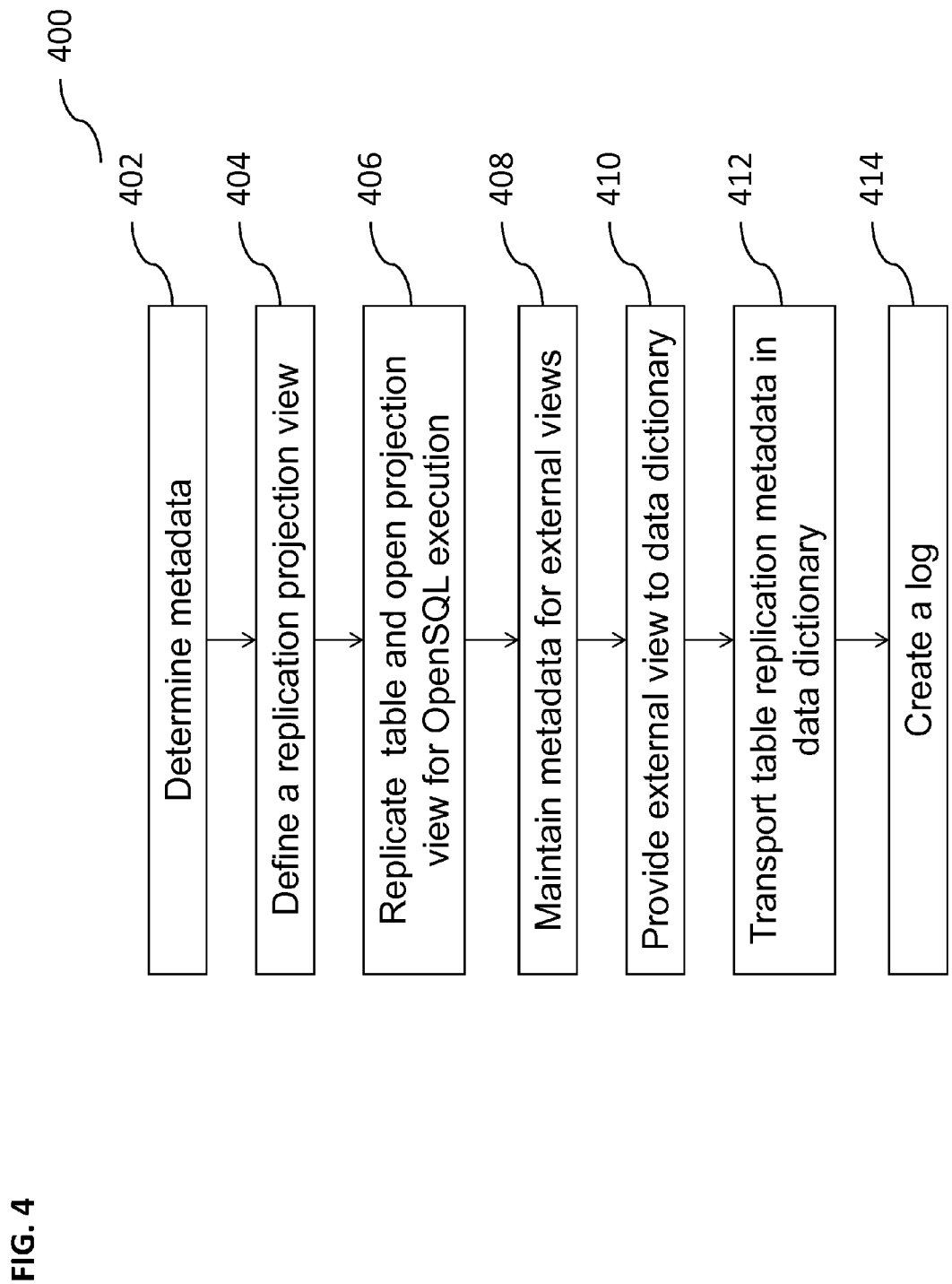
FIG. 4 illustrates an exemplary process for replicating a table metadata from a system (such as a backend system), according to some implementations of the current subject matter.

FIG. 4 illustrates an exemplary process 400 for replicating table metadata from a system (such as a backend system), according to some implementations of the current subject matter. The process can include determining table metadata (at 402), defining a replication projection view (at 404), replicating table and opening projection views for OpenSQL execution (at 406), maintaining metadata for external views (e.g., IMDB views) (at 408), providing the external view to a data dictionary (at 410), transporting the table replication metadata in the data dictionary (at 412), and, optionally, creating a log (at 414). Each of these operations is discussed below in further detail.

Figure 5:
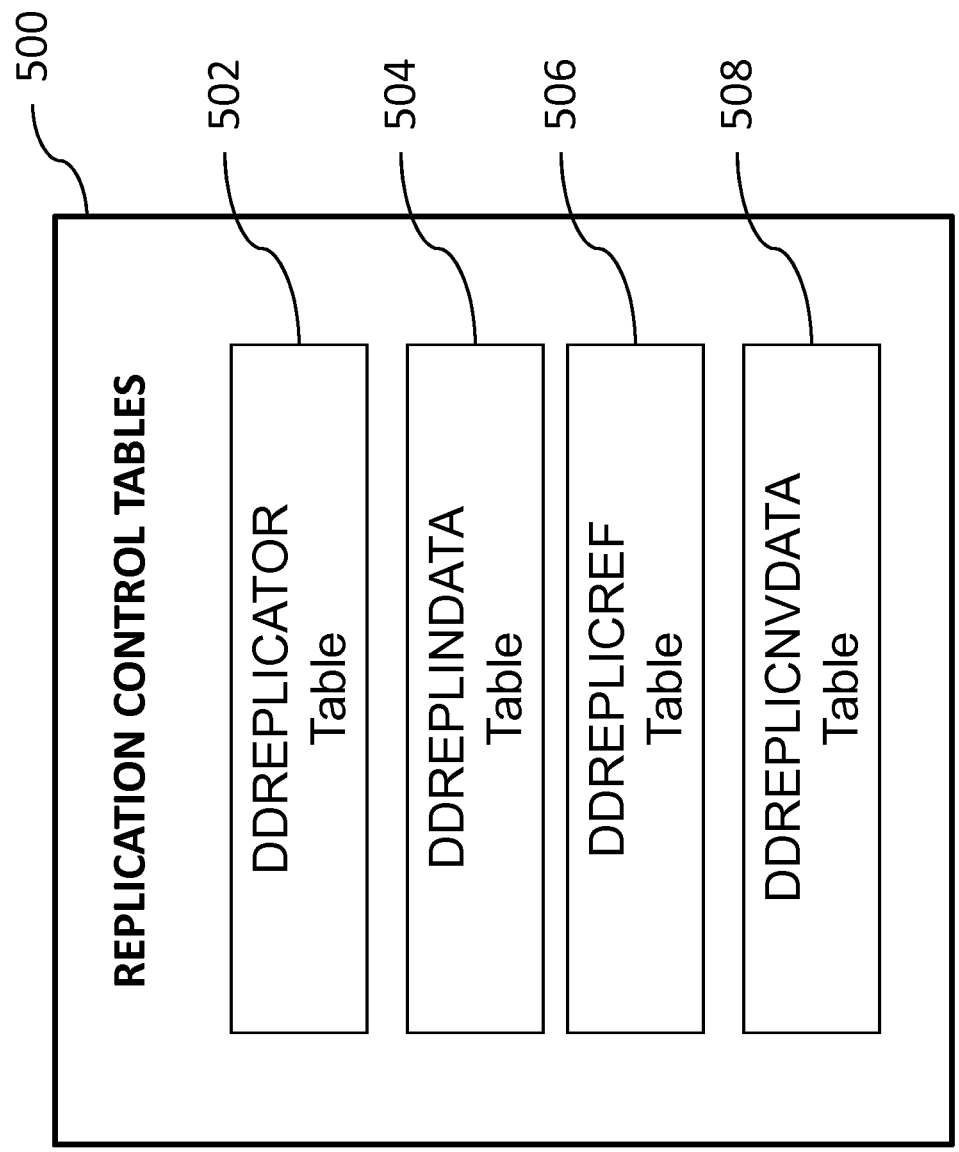
FIG. 5 illustrates exemplary control tables for replication of metadata, according to some implementations of the current subject matter.

To determine table metadata for replication (at 402), a determination is made as to which part(s) of the table's definition will be replicated in the replication database schema. This information can be defined in several replication control tables 500 shown in FIG. 5. The replication control tables 500 can include control table DDREPLICATOR 502 for containing main table data, control table DDREPLINDATA 504 for adding and/or inserting table columns, control table DDREPLICREF 506 for preserving foreign keys, and/or control table DDREPLICNVDATA 508 for changing type(s) of existing table columns.

The control table DDREPLICATOR 502 can be a main control table for the dictionary replicator module. It can control table replication and view creation and can allow defining table metadata. The DDREPLICATOR table 502 can include at least one of the following fields: name of the application, object's type and its original name. This information can build a primary key of the DDREPLICATOR table 502. These fields can be part of every control table 502-508. The name of the application can include an arbitrary name and can be limited by a number of characters (e.g., 60 characters). A new name NEWNAME for a table in the replication database schema and the column names in string field COLUMNS which are to be overtaken from backend system can be selected. Table columns in the DDREPLICATOR table 502 can be replicated using at least one of the following parameters: column DBNAMENEW, column ROWORCOLST, column EXISTCHECK, and DROPCREATE. The column DBNAMENEW can hold a second table name which can be filled if the table's name in database needs to be different from name of replicated table in data dictionary. Column ROWORCOLST can be created in IMDB row store (value R) and/or column store (value C). Column EXISTCHECK can check table's existence in database. The DROPCREATE parameter can be used to drop and recreate a table. Foreign keys and indexes in the table can be preserved and can be overtaken during replication using appropriate parameters, such as PRESERVE_FK and PRESERVE_INDX, respectively.

Control table DDREPLINDATA 504 can be used for performing addition and/or insertion of table columns. New columns can be added by inserting control data into table DDREPLINDATA. Similar to the main control table, an application name, an object type TABL and a table's name can be provided. Also, new column name FIELDNAME-NEW and information about whether the column should be added (KIND=ADD) and/or inserted (KIND=INSERT) can be provided. The add and/or insert function can include the following parameters: DATATYPE representative of a dictionary data type, LENGTH representative of dictionary length, and DECIMALS representative of a number of decimal places if a new column has a decimal type. For the insertion of a column, an insert-position in COLPOSITION can be defined as well.

Control table DDREPLICREF 506 can be used to preserve foreign keys during replication. For preservation of foreign keys, a check table and a reference table can be replicated and foreign key and/or reference field can point to a replicated table if the table does exist in the NGAP system. During replication, data can be written data into DDREPLICREF using columns APPLICATION, OBJNAME and OBJTYPE. The process for preservation of foreign keys can involve providing a name of the field in question in column FIELDNAME, selecting value CHECKTAB for check table and REFTAB for reference table in column KIND, providing CHECKTABLE when KIND column is CHECKTAB, and adding REFTABLE and REFFIELD when KIND column is REFTAB.

Control table DDREPLICNVDATA 508 can be used to change type for existing table columns. To change type of existing table columns, information for columns APPLICATION, OBJNAME and OBJTYPE can be provided and the following operations can be performed: insert a FIELDNAME indicates a data type that needs to be redefined, provide KIND=TYPECHG indicating a type of change, provide DATATYPE indicating dictionary data type, provide LENGTH indicating a dictionary length, and DECIMALS indicating a number of decimal places, if new column should be of type decimal. The target table in the replication system can be created using new data types in dictionary as well as in the database. In some implementations, the data types of the original table and the replicated table can be compatible to ensure table content transfer.

A replication projection view (at 404 shown in FIG. 4) can be defined using table DDREPLICATORVI, according to some implementations of the current subject matter. For this, an application's name and the object's type and name in columns APPLICATION, OBJTYPE and OBJNAME can be provided. The type can be VIEW and the name can contain an arbitrary number of characters (e.g., 30 characters) and can be checked for correctness. The VIEWCLASS can be R which can correspond to replication projection view and the base table's name can be provided in the field BASETABLE. The new table's name can be selected in DDREPLICATOR-NEWNAME. Additionally, a field DEVCLASS and a view column definition, which can be a subset of the base table's columns defined in the field COLUMNS can be provided. Additional fields can include DONE, indicating that the view has been handled, and RC, corresponding to a resulting return code which can provide information concerning various actions and return code. Once the replication projection views are defined, they can be transferred to the dictionary.

Replication of the tables and opening projection views for OpenSQL execution (at 406 shown in FIG. 4) can involve the following operations: selecting table and projection view replication, providing connection information, and filling in any input fields. The information can include information about a source system that contains tables for replication as well as information about connections between the source system and the target system (e.g., target schema's name TS1 in the IMDB of the NGAP system shown in FIG. 3). The replication can include creating of local temporary objects that can represent tables of the current application exist in the data dictionary as well as in the database in schema TS1 in the IMDB and executing OpenSQL on these tables using replication projection views. The views can exist as database views in default schema and select on table in replication schema TS1. Subsequent to this, content of tables can be replicated from the source system to the target system.

Now that the tables are available in the IMDB schema TS1, metadata for external views can be maintained (at 408 shown in FIG. 4), indicating that calculation and analytical models with calculation, analytical and attribute views can now be defined directly on database using the IMDB. This can be done using schema TS2 shown in FIG. 3.

The external views can then be provided to data dictionary (at 410 shown in FIG. 4). Assuming that certain calculation, analytical and attribute views exist in the database in the schema TS2, the views can be overtaken into data dictionary. A control table DDREPLICATORVI can be used. Additionally, DBVIEWNAME can be maintained and name of the IMDB view can be entered. The report RADDDREPLICATOR for the application can be called and creation of external view in data dictionary and providing of schema name (e.g., TS2) can be initiated. Once the view is created, it can be used in OpenSQL.

Once the replicated tables, the replication projection views and external views in the data dictionary are determined, the transporting operation (at 412 shown in FIG. 4) can proceed. Transporting can include transporting table replication metadata in the data dictionary. The table replication metadata can include entries from the tables DDRREPLICATOR, DDREPLINDATA, DDREPLICREF, and DDREPLICNVDATA for a particular application name. The views can be activated and validated against the replication dictionary metadata.

In some implementations, an optional log can be prepared for every operation that is performed during replication (at 414 shown in FIG. 4).

Figure 6:
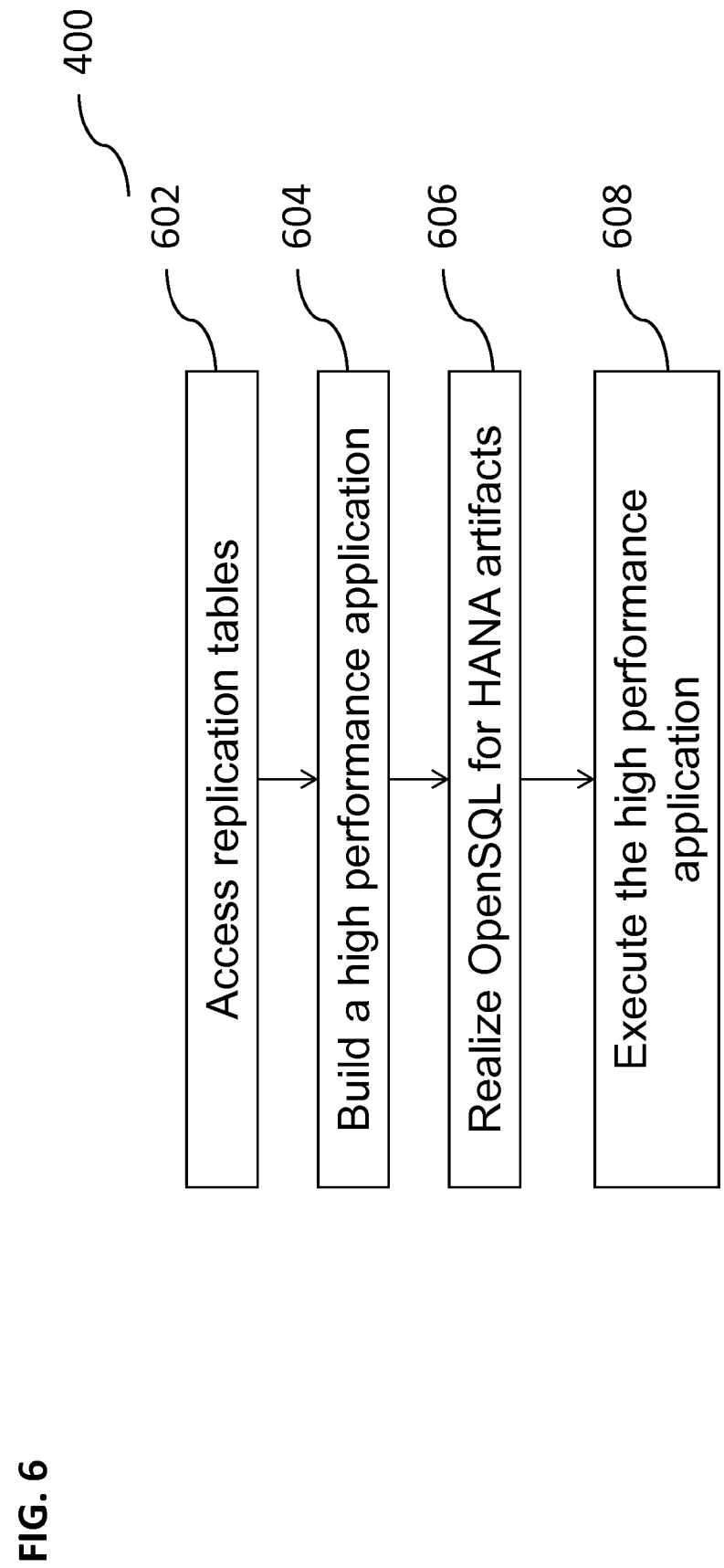
FIG. 6 illustrates an exemplary process for operating on replicated tables, according to some implementations of the current subject matter.

Once the tables are replicated from the source system to the target system, a user can work on the replicated tables. FIG. 6 illustrates an exemplary process 600 for working on replicated tables, according to some implementations of the current subject matter. The process 600 can include accessing replication tables at 602, building a high performance application (HPA) 604, realizing OpenSQL for HANA artifacts at 606, and executing the high performance application (HPA) at 608.

Accessing of replication tables 602 can include maintaining DDREPLICATOR for tables to replicate, maintaining DDREPLICATORVI for every replication projection view, and initiating the dictionary replicator. The building of the high performance application (HPA) 604 can be done based on replicated tables using OpenSQL on the replication projection views in ABAP artifacts and designating them as classes, interfaces, and/or reports. The HPA can use database objects which can be defined and created using the HANA modeler. The database objects can be attribute, analytic and/or calculation views. Realization of OpenSQL for HANA artifacts 606 can include providing column description information of database views in ABAP runtime of the replication NGAP system and redirecting provided column description to views database schema (which can be different from the NGAP default schema). Providing the column description information can include reading views metadata from the database's own metadata, overtaking the column information and mapping it according to dictionary types. Redirection of provided column views can include working with synonyms of the names of views in the database. Hence, an external view in the dictionary can be used to determine which database view should be accessed. This information can be maintained in DDREPLICATORVI control table and can include APPLICATION corresponding to the current application the view belongs to;
OBJECTNAME corresponding to the name of view in data dictionary;
OBJECTTYPE corresponding to the VIEW;
VIEWCLASS X;
BASETABLE which can be the same as OBJECTNAME;
DBVIEWNAME which can be the name of IMDB view; and
DEVCLASS corresponding to the package for the constructed external view.

Executing of the HPA 608 can include initiating the dictionary replicator using table and projection view replication operation. Thus, the execution operation 608 can involve replication of tables and creating of replication projection views on the database. The dictionary replicator can be called, the application's name can be provided and table and projection view replication operation can be initiated. Once the appropriate information along with the replication schema is provided, the replication of tables can be performed to create replicated tables and projection views on the database.

In some implementations, the current subject matter can be implemented in various in-memory database systems, such as a High Performance Analytic Appliance ("HANA") system as developed by SAP AG, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 7:
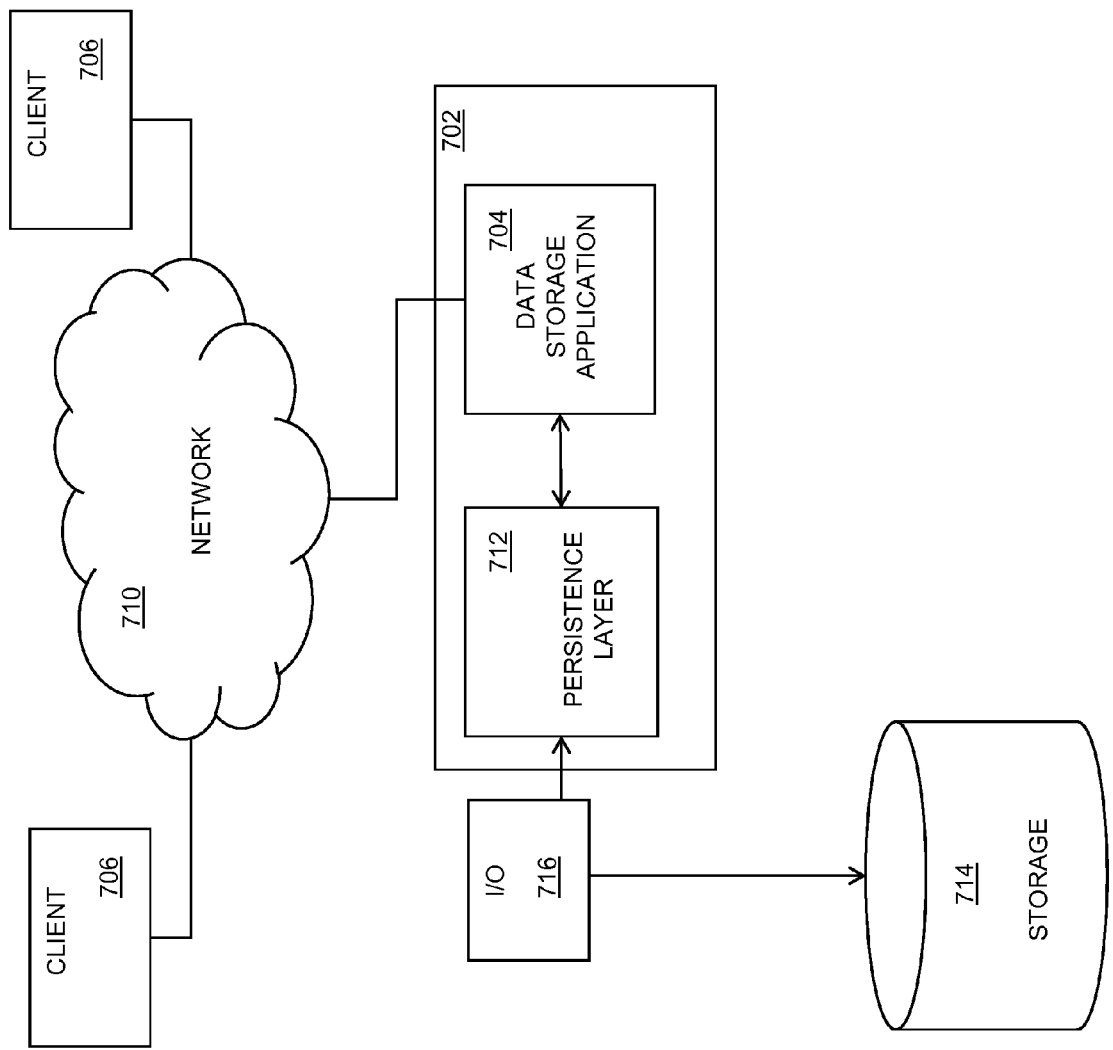
FIG. 7 is a diagram illustrating an exemplary system including a data storage application, according to some implementations of the current subject matter.

FIG. 7 illustrates an exemplary system 700 in which a computing system 702, which can include one or more programmable processors that can be collocated, linked over one or more networks, etc., executes one or more modules, software components, or the like of a data storage application 704, according to some implementations of the current subject matter. The data storage application 704 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 702 as well as to remote users accessing the computing system 702 from one or more client machines 706 over a network connection 710. One or more user interface screens produced by the one or more first modules can be displayed to a user, either via a local display or via a display associated with one of the client machines 706. Data units of the data storage application 704 can be transiently stored in a persistence layer 712 (e.g., a page buffer or other type of temporary persistency layer), which can write the data, in the form of storage pages, to one or more storages 714, for example via an input/output component 716. The one or more storages 714 can include one or more physical storage media or devices (e.g. hard disk drives, persistent flash memory, random access memory, optical media, magnetic media, and the like) configured for writing data for longer term storage. It should be noted that the storage 714 and the input/output component 716 can be included in the computing system 702 despite their being shown as external to the computing system 702 in FIG. 7.

Data retained at the longer term storage 714 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 8:
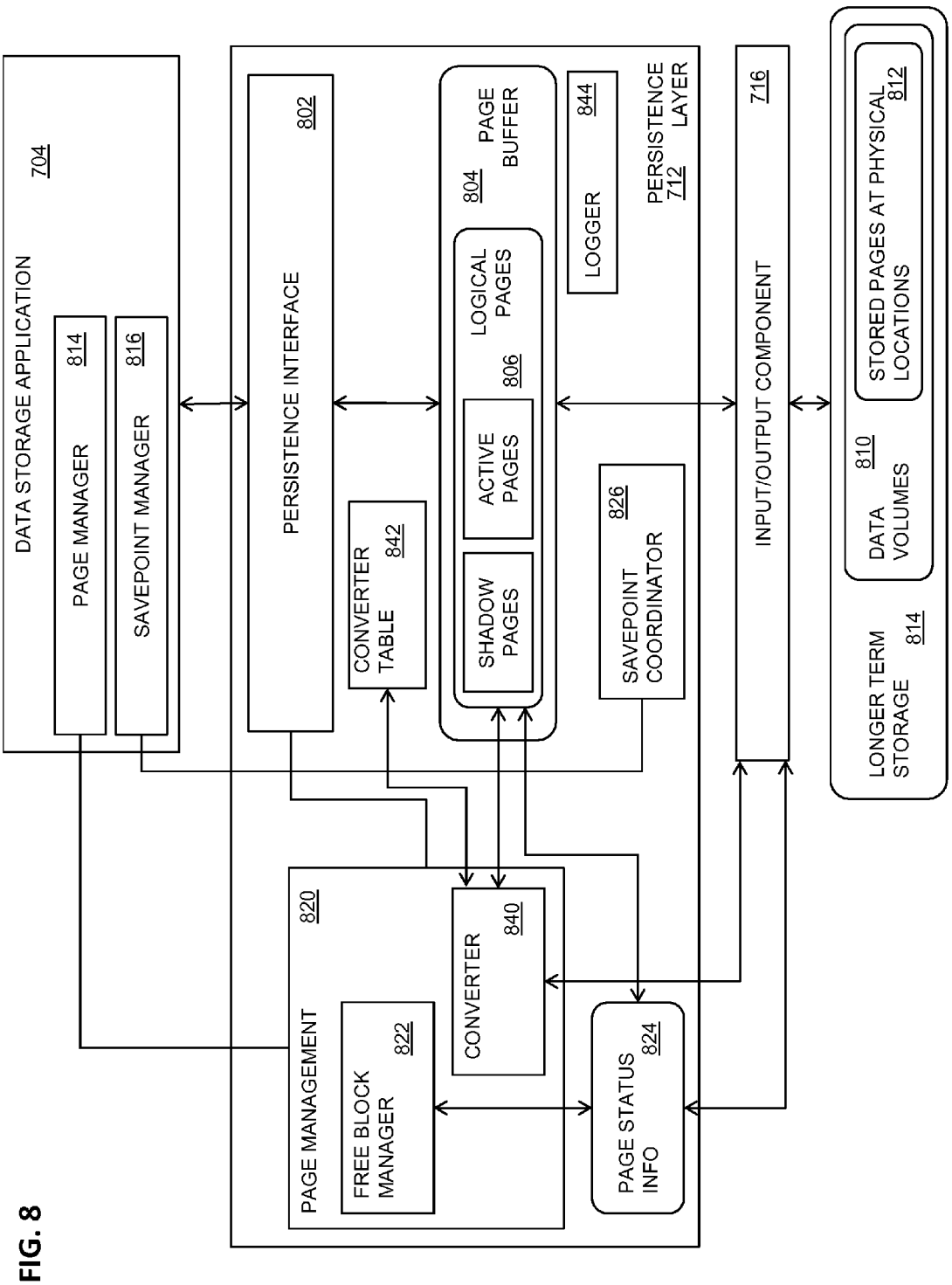
FIG. 8 is a diagram illustrating details of the system of FIG. 7.

FIG. 8 illustrates exemplary software architecture 800, according to some implementations of the current subject matter. A data storage application 704, which can be implemented in one or more of hardware and software, can include one or more of a database application, a network-attached storage system, or the like. According to at least some implementations of the current subject matter, such a data storage application 704 can include or otherwise interface with a persistence layer 712 or other type of memory buffer, for example via a persistence interface 802. A page buffer 804 within the persistence layer 712 can store one or more logical pages 806, and optionally can include shadow pages, active pages, and the like. The logical pages 806 retained in the persistence layer 712 can be written to a storage (e.g. a longer term storage, etc.) 714 via an input/output component 716, which can be a software module, a sub-system implemented in one or more of software and hardware, or the like. The storage 714 can include one or more data volumes 810 where stored pages 812 are allocated at physical memory blocks.

In some implementations, the data storage application 704 can include or be otherwise in communication with a page manager 814 and/or a savepoint manager 816. The page manager 814 can communicate with a page management module 820 at the persistence layer 712 that can include a free block manager 822 that monitors page status information 824, for example the status of physical pages within the storage 714 and logical pages in the persistence layer 712 (and optionally in the page buffer 804). The savepoint manager 816 can communicate with a savepoint coordinator 826 at the persistence layer 712 to handle savepoints, which are used to create a consistent persistent state of the database for restart after a possible crash.

In some implementations of a data storage application 704, the page management module of the persistence layer 712 can implement a shadow paging. The free block manager 822 within the page management module 820 can maintain the status of physical pages. The page buffer 804 can include a fixed page status buffer that operates as discussed herein. A converter component 840, which can be part of or in communication with the page management module 820, can be responsible for mapping between logical and physical pages written to the storage 714. The converter 840 can maintain the current mapping of logical pages to the corresponding physical pages in a converter table 842. The converter 840 can maintain a current mapping of logical pages 806 to the corresponding physical pages in one or more converter tables 842. When a logical page 806 is read from storage 714, the storage page to be loaded can be looked up from the one or more converter tables 842 using the converter 840. When a logical page is written to storage 714 the first time after a savepoint, a new free physical page is assigned to the logical page. The free block manager 822 marks the new physical page as "used" and the new mapping is stored in the one or more converter tables 842.

The persistence layer 712 can ensure that changes made in the data storage application 704 are durable and that the data storage application 704 can be restored to a most recent committed state after a restart. Writing data to the storage 714 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 844 can also be included to store the changes made to the data of the data storage application in a linear log. The logger component 844 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 844 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 712 can use a combination of undo log entries (from one or more logs) and shadow paging.

The persistence interface 802 can handle read and write requests of stores (e.g., in-memory stores, etc.). The persistence interface 802 can also provide write methods for writing data both with logging and without logging. If the logged write operations are used, the persistence interface 802 invokes the logger 844. In addition, the logger 844 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 844. For an entry of type "update", for example, this would be the identification of the affected record and the after image of the modified data.

When the data application 704 is restarted, the log entries need to be processed. To speed up this process the redo log is not always processed from the beginning Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 844 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 844 can write a database log (or simply referred to herein as a "log") sequentially into a memory buffer in natural order (e.g., sequential order, etc.). If several physical hard disks/storage devices are used to store log data, several log partitions can be defined. Thereafter, the logger 844 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 704 can use shadow paging so that the savepoint manager 816 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 9:
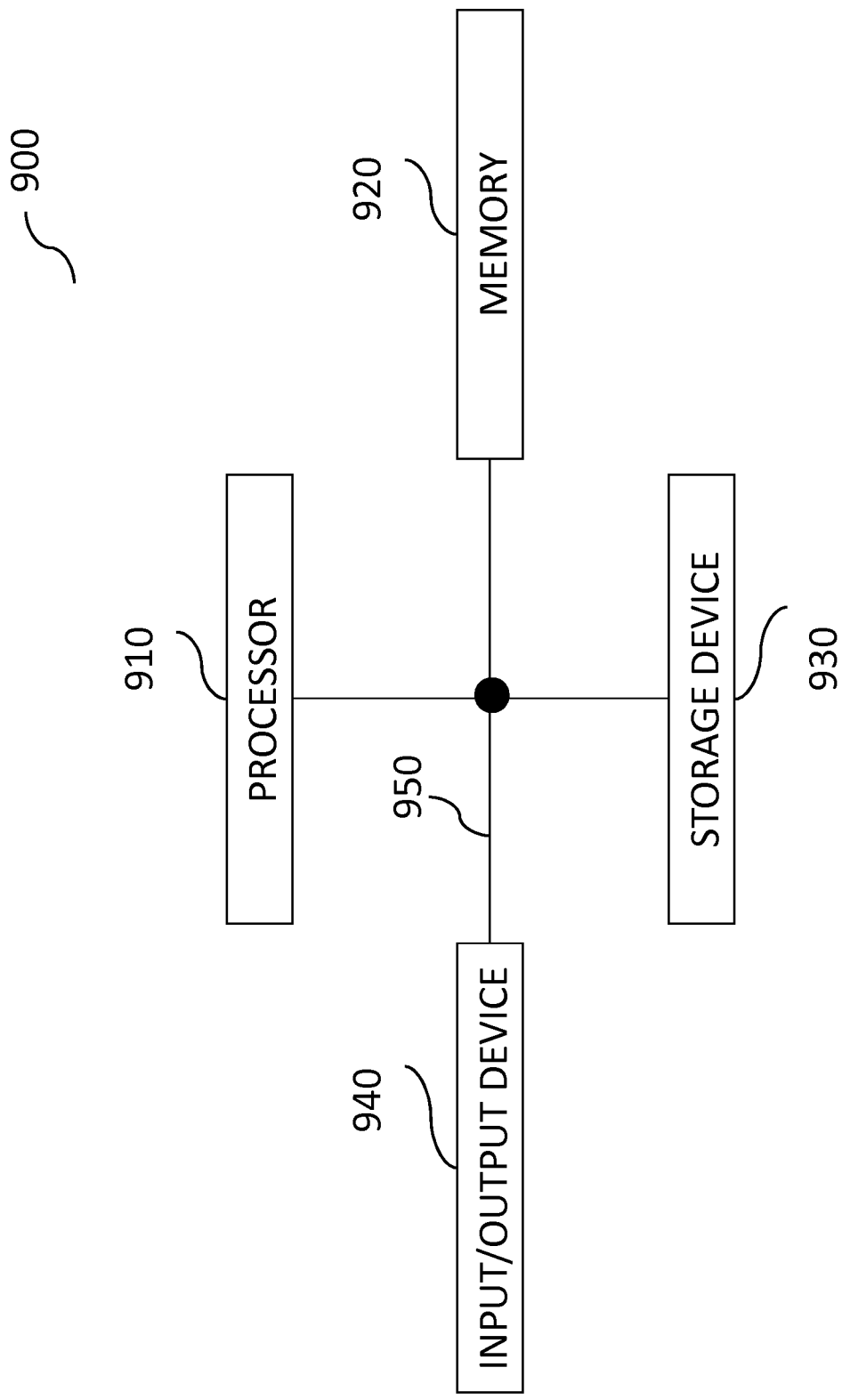
FIG. 9 illustrates an exemplary system, according to some implementations of the current subject matter.

In some implementations, the current subject matter can be configured to be implemented in a system 900, as shown in FIG. 9. The system 900 can include a processor 910, a memory 920, a storage device 930, and an input/output device 940. Each of the components 910, 920, 930 and 940 can be interconnected using a system bus 950. The processor 910 can be configured to process instructions for execution within the system 900. In some implementations, the processor 910 can be a single-threaded processor. In alternate implementations, the processor 910 can be a multi-threaded processor. The processor 910 can be further configured to process instructions stored in the memory 920 or on the storage device 930, including receiving or sending information through the input/output device 940. The memory 920 can store information within the system 900. In some implementations, the memory 920 can be a computer-readable medium. In alternate implementations, the memory 920 can be a volatile memory unit. In yet some implementations, the memory 920 can be a non-volatile memory unit. The storage device 930 can be capable of providing mass storage for the system 900. In some implementations, the storage device 930 can be a computer-readable medium. In alternate implementations, the storage device 930 can be a floppy disk device, a hard disk device, an optical disk device, a tape device, non-volatile solid state memory, or any other type of storage device. The input/output device 940 can be configured to provide input/output operations for the system 900. In some implementations, the input/output device 940 can include a keyboard and/or pointing device. In alternate implementations, the input/output device 940 can include a display unit for displaying graphical user interfaces.

Figure 10:
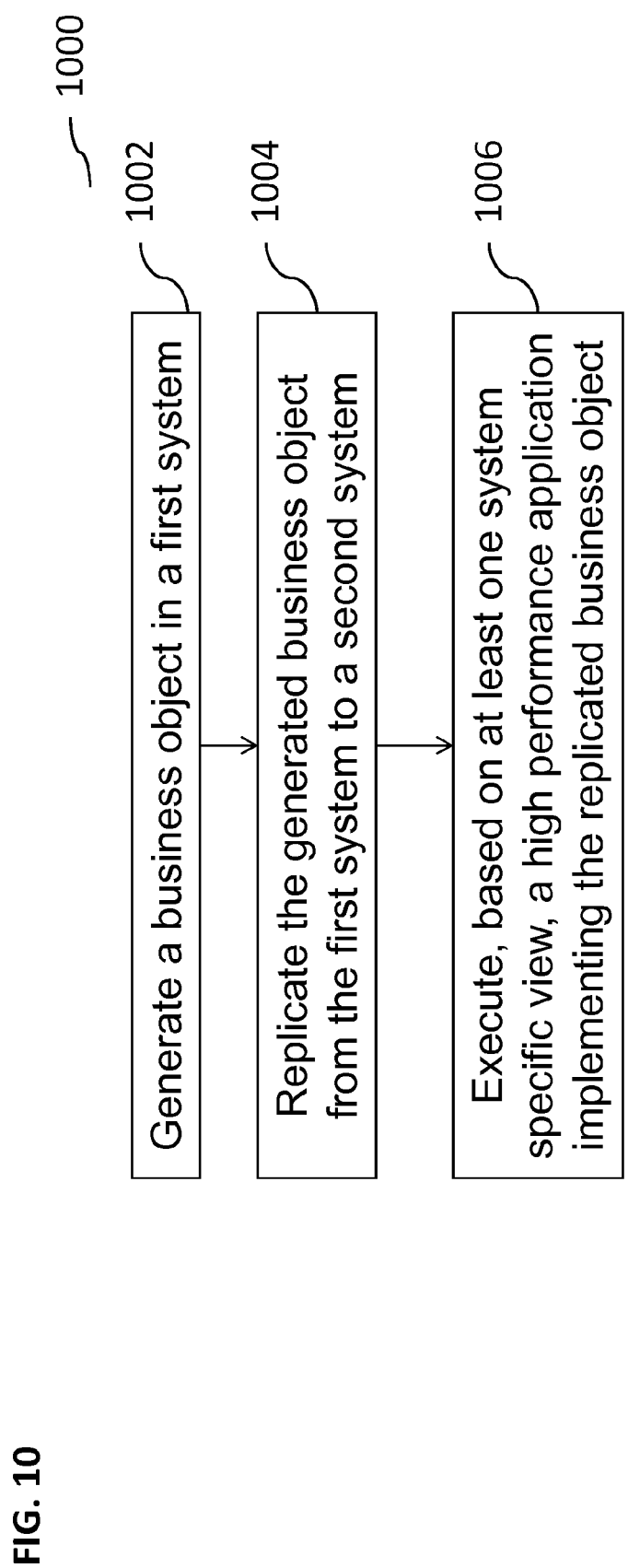
FIG. 10 illustrates an exemplary method, according to some implementations of the current subject matter.

FIG. 10 illustrates an exemplary method 1000, according to some implementations of the current subject matter. At 1002, a business object can be generated in a first system. At 1004, the generated business object can be replicated from the first system to a second system. At 1006, a high performance application implementing the replicated business object can be executed based on at least one system specific view. At least one of the generating, the replicating, and the executing can be performed on at least one processor.

In some implementations, the current subject matter can include one or more of the following optional features. The first system can be an enterprise resource planning system. The second system can be a high performance analytic appliance ("HANA") in-memory database system.

The executing can include obtaining a metadata for a business object from the first system, providing the obtained metadata to the second system, providing, using the provided metadata, access to at least one business object in the second system, and generating, based on the at least one system specific view, at least one artifact of at least one of the first system and the second system.

The replicating can be performed based on at least one replication schema stored in the second system. The business object can include a table containing at least one column and at least one row. A data replicator module can perform the replicating by performing at least one of the following operations: overtake at least one column in the table, overtake metadata added to the table in the first system, rename the table in the second system, optionally specify at least one foreign key associated with the table for overtaking, optionally specify at least one index associated with the table for overtaking, specify at least one of the row store or column store for storing the table in the second system, add a column, remove a column, and provide at least one data type mapping. The data replicator module can create at least one of the following: a replication projection view for providing access to a replicated table in the second system, and an external view for providing OpenSQL access to the second system.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
generating a business object in a first system;
replicating the generated business object from the first system to a second system, the replicating includes defining, in the first system, table metadata for replication using a replication control table of the first system, replication projection and external views, and transporting, using a data dictionary module, the table metadata and the projection and external views to the second system for execution of the generated business object; and
executing, based on at least one system specific view, a high performance application implementing the replicated business object, the high performance application performing analytics of the replicated business object;
wherein at least one of the generating, the replicating, and the executing is performed on at least one processor.

2. The method according to claim 1, wherein the first system is an enterprise resource planning system.

3. The method according to claim 1, wherein the second system is a high performance analytic appliance in-memory database system.

4. The method according to claim 1, wherein the executing further comprises
obtaining a metadata for a business object from the first system;
providing the obtained metadata to the second system;
providing, using the provided metadata, access to at least one business object in the second system; and
generating, based on the at least one system specific view, at least one artifact of at least one of the first system and the second system.

5. The method according to claim 1, wherein the replicating is performed based on at least one replication schema stored in the second system.

6. The method according to claim 1, wherein the business object includes a table containing at least one column and at least one row;
wherein a data replicator module performs the replicating by performing at least one of the following operations: overtake at least one column in the table, overtake metadata added to the table in the first system, rename the table in the second system, optionally specify at least one foreign key associated with the table for overtaking, optionally specify at least one index associated with the table for overtaking, specify at least one of the row store or column store for storing the table in the second system, add a column, remove a column, and provide at least one data type mapping.

7. The method according to claim 6, wherein the data replicator module creates at least one of the following: a replication projection view for providing access to a replicated table in the second system, and an external view for providing OpenSQL access to the second system.

8. A computer program product comprising a non-transitory machine-readable storage medium storing instructions that, when executed by at least one programmable processor, cause the at least one programmable processor to perform operations comprising:
generating a business object in a first system;
replicating the generated business object from the first system to a second system, the replicating includes defining, in the first system, table metadata for replication using a replication control table of the first system, replication projection and external views, and transporting, using a data dictionary module, the table metadata and the projection and external views to the second system for execution of the generated business object; and
executing, based on at least one system specific view, a high performance application implementing the replicated business object, the high performance application performing analytics of the replicated business object.

9. The computer program product according to claim 8, wherein the first system is an enterprise resource planning system.

10. The computer program product according to claim 8, wherein the second system is a high performance analytic appliance in-memory database system.

11. The computer program product according to claim 8, wherein the executing further comprises
obtaining a metadata for a business object from the first system;
providing the obtained metadata to the second system;
providing, using the provided metadata, access to at least one business object in the second system; and
generating, based on the at least one system specific view, at least one artifact of at least one of the first system and the second system.

12. The computer program product according to claim 8, wherein the replicating is performed based on at least one replication schema stored in the second system.

13. The computer program product according to claim 8, wherein the business object includes a table containing at least one column and at least one row;
wherein a data replicator module performs the replicating by performing at least one of the following operations: overtake at least one column in the table, overtake metadata added to the table in the first system, rename the table in the second system, optionally specify at least one foreign key associated with the table for overtaking, optionally specify at least one index associated with the table for overtaking, specify at least one of the row store or column store for storing the table in the second system, add a column, remove a column, and provide at least one data type mapping.

14. The computer program product according to claim 13, wherein the data replicator module creates at least one of the following: a replication projection view for providing access to a replicated table in the second system, and an external view for providing OpenSQL access to the second system.

15. A system comprising:
at least one programmable processor; and
a machine-readable medium storing instructions that, when executed by the at least one programmable processor, cause the at least one programmable processor to perform operations comprising:
generating a business object in a first system;
replicating the generated business object from the first system to a second system, the replicating includes defining, in the first system, table metadata for replication using a replication control table of the first system, replication projection and external views, and transporting, using a data dictionary module, the table metadata and the projection and external views to the second system for execution of the generated business object; and
executing, based on at least one system specific view, a high performance application implementing the replicated business object, the high performance application performing analytics of the replicated business object.

16. The system according to claim 15, wherein the first system is an enterprise resource planning system; and
the second system is a high performance analytic appliance in-memory database system.

17. The system according to claim 15, wherein the executing further comprises
obtaining a metadata for a business object from the first system;
providing the obtained metadata to the second system;
providing, using the provided metadata, access to at least one business object in the second system; and
generating, based on the at least one system specific view, at least one artifact of at least one of the first system and the second system.

18. The system according to claim 15, wherein the replicating is performed based on at least one replication schema stored in the second system.

19. The system according to claim 15, wherein the business object includes a table containing at least one column and at least one row;
wherein a data replicator module performs the replicating by performing at least one of the following operations: overtake at least one column in the table, overtake metadata added to the table in the first system, rename the table in the second system, optionally specify at least one foreign key associated with the table for overtaking, optionally specify at least one index associated with the table for overtaking, specify at least one of the row store or column store for storing the table in the second system, add a column, remove a column, and provide at least one data type mapping.

20. The system according to claim 19, wherein the data replicator module creates at least one of the following: a replication projection view for providing access to a replicated table in the second system, and an external view for providing OpenSQL access to the second system.

* * * * *